United States Patent
Mohamad

(10) Patent No.: US 11,334,913 B1
(45) Date of Patent: May 17, 2022

(54) METHOD, APPARATUS, AND COMPUTER PROGRAM PRODUCT FOR FACILITATING THE ACTIVATION OF PROMOTIONS USING SHORT CODES

(71) Applicant: Groupon, Inc., Chicago, IL (US)

(72) Inventor: Azmath Mohamad, Bangalore (IN)

(73) Assignee: GROUPON, INC., Chicago, IL (US)

( * ) Notice: Subject to any disclaimer, the term of this patent is extended or adjusted under 35 U.S.C. 154(b) by 571 days.

(21) Appl. No.: 15/228,263

(22) Filed: Aug. 4, 2016

Related U.S. Application Data

(60) Provisional application No. 62/200,906, filed on Aug. 4, 2015.

(51) Int. Cl.
*G06Q 30/02* (2012.01)
*H04W 4/12* (2009.01)
*H04W 12/06* (2021.01)

(52) U.S. Cl.
CPC .......... *G06Q 30/0251* (2013.01); *H04W 4/12* (2013.01); *H04W 12/06* (2013.01)

(58) Field of Classification Search
CPC ........................................... G06Q 30/02–0277
See application file for complete search history.

(56) References Cited

U.S. PATENT DOCUMENTS

| | | | | |
|---|---|---|---|---|
| 8,355,948 B2 | | 1/2013 | Mason | |
| 9,119,076 B1 * | | 8/2015 | Gubbi | H04L 63/0838 |
| 10,521,856 B1 * | | 12/2019 | Joseph | G06Q 10/02 |
| 2007/0060177 A1 * | | 3/2007 | Major | H04L 51/066 |
| | | | | 455/466 |
| 2007/0190995 A1 * | | 8/2007 | Wang | H04M 1/72552 |
| | | | | 455/419 |
| 2008/0065490 A1 * | | 3/2008 | Novick | G06Q 30/02 |
| | | | | 705/14.26 |

(Continued)

OTHER PUBLICATIONS

C. Wong. "Watchdog wants CRTC to tackle SMS short codes". Jul. 6, 2011. it.business.ca. [retrieved from internet on Feb. 13, 2019] <URL: https://www.itbusiness.ca/news/watchdog-wants-crtc-to-tackle-sms-short-codes/16432> (Year: 2011).*

(Continued)

*Primary Examiner* — Bion A Shelden
(74) *Attorney, Agent, or Firm* — Alston & Bird LLP

(57) ABSTRACT

Systems, methods, apparatus, and computer program products are provided for facilitating immediate activation of a promotion. One example embodiment may include an apparatus for facilitating immediate activation of a promotion, the apparatus comprising registration circuitry configured to receive promotion component information, the promotion component information comprising one or more products or services and a price, generate a promotion comprising the promotion component information, and assign promotion identification information to the promotion; and activation circuitry configured to receive information provided in a text message, the text message comprising at least the promotion identification information, a command, the text message addressed to a short code, the command indicative of an instruction to perform with regard to the promotion identified by the promotion identification information.

15 Claims, 5 Drawing Sheets

(56) References Cited

U.S. PATENT DOCUMENTS

| | | | | |
|---|---|---|---|---|
| 2008/0125147 A1* | 5/2008 | Maguire | G06Q 30/02 | 455/466 |
| 2010/0227605 A1* | 9/2010 | Fournier | H04W 12/10 | 455/419 |
| 2011/0106603 A1* | 5/2011 | McCann | G06Q 30/02 | 705/14.21 |
| 2012/0221962 A1* | 8/2012 | Lew | H04L 29/12896 | 715/752 |
| 2012/0265597 A1* | 10/2012 | Saha | G06Q 30/02 | 705/14.28 |
| 2013/0073381 A1* | 3/2013 | Binkley | G06Q 30/02 | 705/14.48 |
| 2013/0179350 A1* | 7/2013 | Kirillin | G06Q 40/02 | 705/64 |
| 2013/0246299 A1* | 9/2013 | Lovegreen | G06Q 30/06 | 705/346 |
| 2014/0025490 A1* | 1/2014 | Shekar | G06F 16/9535 | 705/14.53 |
| 2014/0108108 A1* | 4/2014 | Artman | G06Q 20/32 | 705/14.1 |
| 2014/0172589 A1* | 6/2014 | Rhiner | G06Q 30/0276 | 705/14.72 |
| 2014/0258103 A1* | 9/2014 | Gupta | G06Q 40/12 | 705/39 |
| 2014/0279011 A1* | 9/2014 | McMullen | G06Q 30/0261 | 705/14.58 |
| 2015/0038181 A1* | 2/2015 | Magadevan | H04M 3/42382 | 455/466 |
| 2015/0161883 A1* | 6/2015 | Satgunam | G08C 17/02 | 340/5.8 |
| 2015/0304389 A1* | 10/2015 | Chiussi | H04W 4/12 | 709/203 |
| 2015/0341415 A1* | 11/2015 | Singhal | H04L 67/025 | 709/203 |
| 2015/0371216 A1* | 12/2015 | Olawale | G06Q 20/34 | 705/39 |
| 2016/0098755 A1* | 4/2016 | Silvestro | G06Q 30/0258 | 705/14.56 |
| 2016/0247245 A1* | 8/2016 | Baic | G06Q 50/18 | |
| 2016/0292730 A1* | 10/2016 | Perry | G06Q 30/0276 | |
| 2016/0353258 A1* | 12/2016 | Stuntebeck | H04W 4/14 | |
| 2017/0054600 A1* | 2/2017 | Leung | H04W 48/16 | |
| 2017/0193565 A1* | 7/2017 | Meyer | H04W 4/14 | |

OTHER PUBLICATIONS

SmallBusiness.com. "How to Use Twitter with Text-messaging (SMS) Commands". Mar. 19, 2014. [archived on Jul. 2, 2014, retrieved from archive.com on Dec. 24, 2021] <URL: https://web.archive.org/web/20140702160910/http://smallbusiness.com/tech/twitter-sms-commands/> (Year: 2014).*

In re: Francisco Jose Larrain Wicha; U.S. Application titled Method, Apparatus, and Computer Readable Medium for Providing a Self-Service Interface; U.S. Appl. No. 13/749,272, filed Jan. 24, 2013.

In re: Sean O'Brien; U.S. Application titled Relevance System for Consumer Deals; U.S. Appl. No. 13/411,502, filed Mar. 2, 2012.

In re: Amit Aggarwal; U.S. Application titled Promotion Offering System; U.S. Appl. No. 13/829,581, filed Mar. 14, 2013.

* cited by examiner

METHOD, APPARATUS, AND COMPUTER PROGRAM PRODUCT FOR FACILITATING THE ACTIVATION OF PROMOTIONS USING SHORT CODES

CROSS REFERENCES TO RELATED APPLICATIONS

This application claims the benefit of U.S. Provisional Patent Application No. 62/200,906, filed on Aug. 4, 2015, the entire contents of which are incorporated herein by reference.

FIELD

Embodiments of the invention relate, generally, to facilitating the activation of promotions, and more specifically to the immediate activation of a promotion using service identifiers and short codes via cellular networks.

BACKGROUND

Applicant has discovered problems with current methods of activating and deactivating promotions. In some examples, the activation and/or deactivation of one or more promotions may be improved. Through applied effort, ingenuity, and innovation, Applicant has solved many of these identified problems by developing a solution that is embodied by the present invention, which is described in detail below.

BRIEF SUMMARY

In general, embodiments of the present invention provided herein include systems, methods and computer readable media for facilitating the activation and/or the deactivation of promotions. Some embodiments provide for the activation and/or deactivation using a website and/or a mobile application when a user device has a WIFI connection. Furthermore, some embodiments provided herein include systems, methods and computer readable media for facilitating the immediate activation of a promotion using service identifiers and short codes via, for example, cellular networks.

In some embodiments, an apparatus may be provided for facilitating immediate activation of a promotion, the apparatus comprising registration circuitry configured to receive promotion component information, the promotion component information comprising one or more products or services and a price, generate a promotion comprising the promotion component information, and assign promotion identification information to the promotion, and activation circuitry configured to receive information provided in a text message, the text message comprising at least the promotion identification information, a command, the text message addressed to a short code, the command indicative of an instruction to perform with regard to the promotion identified by the promotion identification information.

In some embodiments, the registration circuitry is further configured to receive a device identifier, and perform an authentication process confirming authenticity of the device identifier, the information provided in the text message includes a cellular phone number, and the activation circuitry is further configured to validate the cellular phone number as the device identifier.

In some embodiments, the command is an instruction to activate the promotion. In some embodiments, the command is an instruction to deactivate the promotion. In some embodiments, the registration circuitry is further configured to receive a device identifier, wherein the information provided in the text message further includes a cellular phone number, and the activation circuitry is further configured to validate the cellular phone number as the device identifier, and validate the device identifier as associated with the promotion identification information.

In some embodiments, the activation circuitry is further configured to, upon activation, cause an electronic marketing communication to offer the promotion to one or more relevant consumers. In some embodiments, the activation circuitry is further configured to, upon deactivation, cause electronic marketing communications to cease offering the promotion to consumers.

In some embodiments, a computer program product may be provided for facilitating immediate activation of a promotion, the computer program product comprising at least one non-transitory computer-readable storage medium having computer-executable program code instructions stored therein, the computer-executable program code instructions comprising program code instructions for causing registration circuitry to receive promotion component information, the promotion component information comprising one or more products or services and a price, generate a promotion comprising the promotion component information, and assign promotion identification information to the promotion, and causing activation circuitry to receive information provided in a text message, the text message comprising at least the promotion identification information, a command, the text message addressed to a short code, the command indicative of an instruction to perform with regard to the promotion identified by the promotion identification information.

In some embodiments, the computer-executable program code instructions further comprise program code instructions for further causing the registration circuitry to receive a device identifier, and perform an authentication process confirming authenticity of the device identifier, and wherein the information provided in the text message includes a cellular phone number, and wherein the activation circuitry is further configured to validate the cellular phone number as the device identifier.

In some embodiments, the command is an instruction to activate the promotion. In some embodiments, the command is an instruction to deactivate the promotion. In some embodiments, the computer-executable program code instructions further comprise program code instructions for further causing the registration circuitry to receive a device identifier, wherein the information provided in the text message further includes a cellular phone number, and for further causing the activation circuitry to validate the cellular phone number as the device identifier, and validate the device identifier as associated with the promotion identification information.

In some embodiments, the computer-executable program code instructions further comprise program code instructions for further causing the registration circuitry to upon activation, cause an electronic marketing communication to offer the promotion to one or more relevant consumers. In some embodiments, the computer-executable program code instructions further comprise program code instructions for further causing the registration circuitry to upon deactivation, cause electronic marketing communications to cease offering the promotion to consumers.

In some embodiments, a method may be provided for facilitating immediate activation of a promotion, the method comprising receiving, via registration circuitry, promotion component information, the promotion component information comprising one or more products or services and a price, generating, via the registration circuitry, a promotion comprising the promotion component information, and assigning, via the registration circuitry, promotion identification information to the promotion, receiving, via activation circuitry, information provided in a text message, the text message comprising at least the promotion identification information, a command, the text message addressed to a short code, the command indicative of an instruction to perform with regard to the promotion identified by the promotion identification information.

In some embodiments, the method may further comprise receiving, via registration circuitry, a device identifier, and performing, via registration circuitry, an authentication process confirming authenticity of the device identifier, wherein the information provided in the text message includes a cellular phone number, and validating, via registration circuitry, the cellular phone number as the device identifier.

In some embodiments, the command is an instruction to activate the promotion. In some embodiments, the command is an instruction to deactivate the promotion. In some embodiments, the method may further comprise receiving, via registration circuitry, a device identifier, wherein the information provided in the text message further includes a cellular phone number, validating, via registration circuitry, the cellular phone number as the device identifier, and validating, via registration circuitry, the device identifier as associated with the promotion identification information.

In some embodiments, the method may further comprise upon activation, causing, via activation circuitry, an electronic marketing communication to offer the promotion to one or more relevant consumers. In some embodiments, the method may further comprise upon deactivation, causing, via activation circuitry, electronic marketing communications to cease offering the promotion to consumers.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

Figure 3:
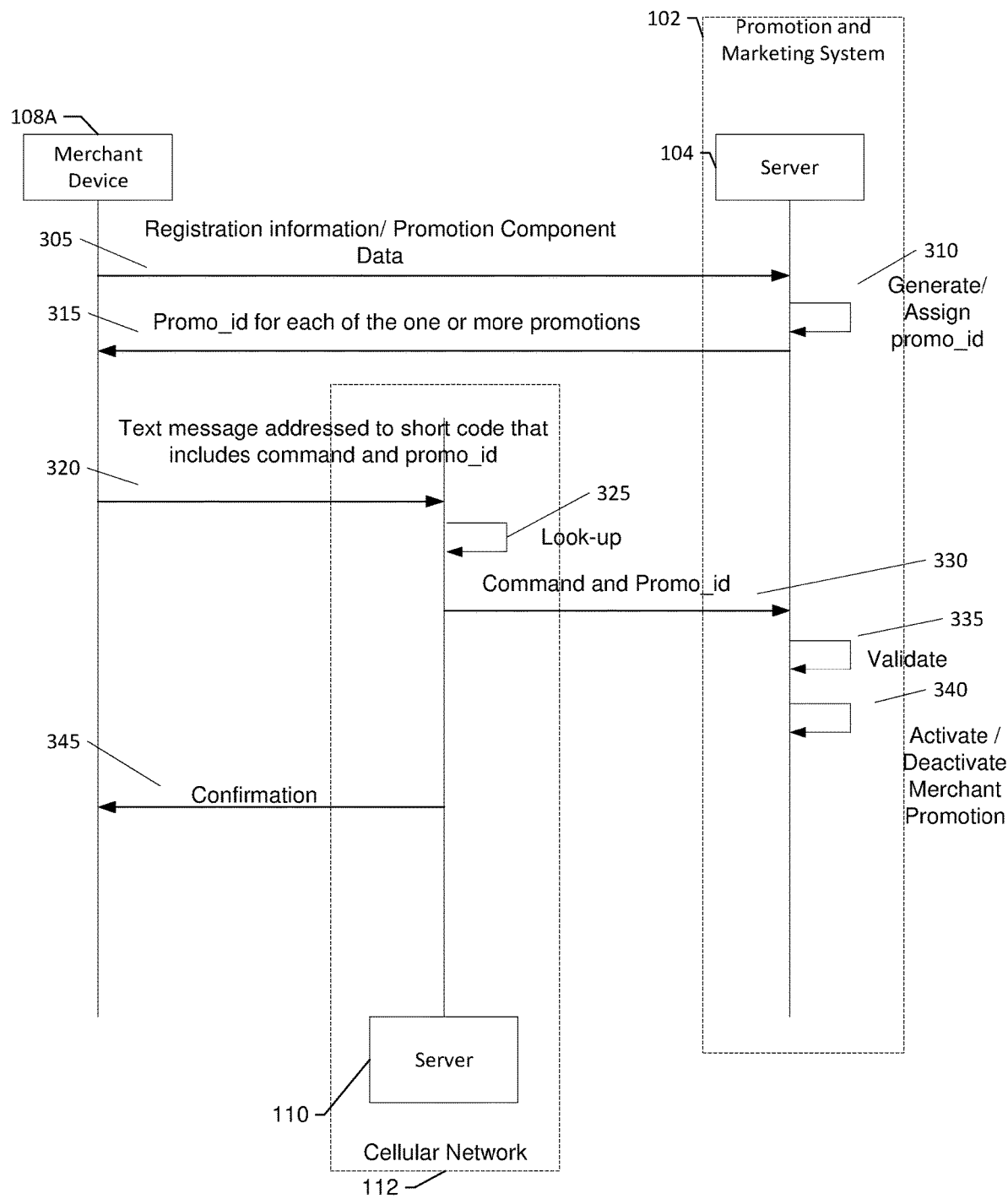

FIG. 3 is data flow diagram of a system that is configured to facilitate the immediate activation or deactivation of a promotion, in accordance with an example embodiment; and FIGS. 4-7 show flowcharts illustrating methods for providing and/or generating various price streams for utilization in the management and application of price changes, in accordance with embodiments of the present invention.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Overview

Various embodiments of the present invention are directed to improved apparatuses, methods, and computer readable media for facilitating the immediate or near immediate activation and/or the deactivation of promotions. While some embodiments of the present invention allow for immediate or near immediate activation and/or deactivation of one or more promotions using a website and/or a mobile application when a user device has a WIFI connection, other embodiments provide solutions for the immediate or near immediate activation and/or de-activation or one or more promotions when a user device (e.g., a mobile telephone or the like) does not have a WIFI connection.

In this regard, some embodiments provided herein include systems, methods and computer readable media for facilitating the immediate or near immediate activation of a promotion via, for example, cellular networks. That is, some embodiments of the present invention provide systems, devices, and frameworks that enable communication between a user device and a promotion and marketing system via a cellular network.

While a cellular network may enable use of the same website and/or mobile application that a user may utilize when connected via WIFI, some embodiments of the present invention enable the use of a text message or the like to communicate with the promotion and marketing system. A text message may be addressed to a short code and be in a format that may include a command (e.g., start, stop, etc.) and promotion identification information. As such, a user who is for example, on the "sales floor" and is not in a position to log in to a website or operate a mobile app need only send a text message to facilitate the immediate or near immediate activation and/or deactivation of a promotion.

Definitions

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling well or that sales of the product or service result in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

The term "short code", as used herein may refer to a special shortened telephone number that is used to send/receive SMS (short message service) and MMS (multimedia messaging service) messages to/from devices, such as mobile phones or the like. A short code may enable communication between a user (e.g., operating a user device such as a cellular phone or the like) and a promotion and marketing system server.

An SMS message, as used herein, may be a text message and a MMS message may refer to a text message with pictures, videos, or other entertainment aspects attached to it. Short codes may be associated with shared keywords or dedicated keywords. Shared keywords, as used herein, may refer to service identifiers such as start, stop, edit, or the like. While dedicated keywords may refer to promotion identifiers, user identifiers, custom commands, or the like. In some embodiments, with a shared short code, each user (e.g., merchant, employee of a merchant, etc.) having access and/or permission to use the short code may be given their own keyword. The keyword may be used to differentiate each user of the short code and/or determine who will receive messages sent to the short number.

In some embodiments, a number of pre-determined rules (e.g., user and/or system configurable rules, government regulations, or the like) may govern a short code. For example, in order for the text message sender to be allowed to send a message to a specific cell phone number, the text message sender must have the cell phone owner's previous permission, which may be obtained by, what may be referred to herein as an opt-in program. In some embodiments, a mobile phone user must give their explicit permission to the sender indicating their permission to receive messages from a text message sender.

In some embodiments, "activate" as used herein may refer to the act of offering the promotion for sale by, for example, providing the promotion content to one or more consumers via an electronic marketing communication. In some embodiments, "deactivate", as used herein, may refer to the act of stopping the offering of a promotion for sale or otherwise revoking any offers to sell. In some embodiments, a deactivated promotion may no longer be provided for sale in any electronic marketing communication. In some embodiments, the promotion and marketing service may (1) honor promotions that have been purchased, but not yet redeemed and discontinue the sale of promotions; (2) refund promotions that have been purchased, but yet not redeemed; and/or (3) give cash value of purchase price (but not promotion value).

Technical Underpinnings and Implementation of Exemplary Embodiments

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process. As a result, new technologies have been developed to gather, aggregate, analyze, and report information from a variety of electronic sources.

So-called "clickstream data" provides a robust set of information describing the various interactions consumers have with electronic marketing information provided to them by merchants and others. Promotion and marketing services have been developed with sophisticated technology to receive and process this data for the benefit of both merchants and consumers. These services assist merchants with marketing their products to interested consumers, while reducing the chance that a consumer will be presented with marketing information in which the consumer has no interest. Some promotion and marketing services further leverage their access to the trove of electronic marketing information to assist merchants and consumers with other tasks, such as offering improved merchant point-of-sale systems, improved inventory and supply chain management, improved methods for delivering products and services, and the like.

Unlike conventional marketing techniques related to the use of paper or other physical media (e.g., coupons clipped from a weekly newspaper), promotion and marketing services offer a wealth of additional electronic solutions to improve the experience for consumers and merchants. The ability to closely monitor user impressions provides the ability for the promotion and marketing service to gather data related to the time, place, and manner in which the consumer engaged with the impression (e.g., viewed, clicked, moused-over) and obtained and redeemed the promotion. The promotion and marketing service may use this information to determine which products and services are most relevant to the consumer's interest, and to provide marketing materials related to said products and services to the consumer, thus improving the quality of the electronic marketing communications received by the consumer. Merchants may be provided with the ability to dynamically monitor and adjust the parameters of promotions offered by the promotion and marketing service, ensuring that the merchant receives a positive return on their investment. For example, the merchant can closely monitor the type, discount level, and quantity sold of a particular promotion on the fly, while with traditional printed coupons the merchant would not be able to make any changes to the promotion after the coupon has gone to print. Each of these advancements in digital market and promotion distribution involve problems unique to the digital environment not before seen in traditional print or television broadcast marketing.

However, these promotion and marketing services are not without problems. Although the clickstream data provides a wealth of information, the inventors have determined that existing techniques may not always leverage this information in an efficient or accurate manner. Technology continues to rapidly advance in the field of analytics and the processing of this information, offering improved data gathering and analysis techniques, resulting in more relevant and accurate results provided in a more efficient manner. Electronic marketing services continue to evolve and provide improved methods for engaging consumers and spreading awareness of products offered by promotion and marketing services.

In many cases, the inventors have determined that these services are constrained by technological obstacles unique to the electronic nature of the services provided, such as constraints on data storage, machine communication and processor resources. The inventors have identified that the wealth of electronic data available to these services and the robust nature of electronic marketing communications techniques present new challenges never contemplated in the world of paper coupons and physical marketing techniques. The inventors have further determined that even technological methods that leverage computers for statistical analysis and consumer behavior modeling (e.g., television rating systems) fail to address problems associated with providing relevant, high quality electronic marketing communications (e.g., impressions) to consumers in a manner that maximizes accuracy, minimizes error, is user friendly and provides for efficient allocation of resources. Embodiments of the present invention as described herein serve to correct these errors and offer improved resource utilization, thus providing improvements to electronic marketing services that address problems arising out of the electronic nature of those services.

When offering digital promotions through a promotion and marketing service, merchants interact with the promotion and marketing service to provide details of the promotion, such as the particular product, service or experience as well as specific promotion components, promotion content and redemption parameters. Initial registration and setup to allow a merchant to provide promotions using a promotion system is typically a lengthy and involved process. The inventors have determined, however, that the lengthy and complex nature of the promotion generation process means that the process is often not convenient enough for many merchants who wish to provide promotions, since each merchant must interact with the promotion and marketing service via a mobile app or website for the various steps in the process. That is, while the owner of a restaurant may wish to provide a promotion with remaining fresh inventory as a night unfolds, she may be unable to find the time to interact with the promotion and marketing service while her customers require attention.

Moreover, the inventors have determined that the lengthy and complex nature of the promotion generation process also means that the process is often not responsive enough for many merchants who wish to provide promotions, since each merchant must interact with the promotion and marketing service to perform the various steps in the process. That is, again, while the owner of a restaurant may wish to provide a promotion for remaining fresh inventory as a night unfolds, she may be unable to fulfill the demand that such a promotion may cause.

The inventors have identified various problems and difficulties that occur in providing merchants with the opportunity to create and sell promotions. In particular, the inventors have determined that the process of generating a new promotion requires an internet connection or other high bandwidth conduit to the promotion and marketing service to execute or otherwise provide the required information necessary for generating a new promotion.

Electronic systems have been developed that reduce the need for high data throughput when generating a promotion. However, these solutions, in some examples, still require the merchant to have some type of internet connection. For example, a food truck may wish to provide a promotion, but, because of the nature of the food truck business, lacks a reliable WIFI or other internet connection.

Moreover, current electronic systems still require interaction with a website or mobile app. However, these solutions, still require the merchant to redirect focus from current customers or tasks in order to use.

The inventors have realized that, without more responsive or convenient processes, merchants may forego generating promotions resulting in lost revenue of both the merchant and the promotion and marketing service. Additionally, using current methods merchants may attempt to generate promotions and become frustrated with the time spent waiting for websites to load or mobile app data to transmit (where unreliable WIFI or internet is a problem) or with the time spent having to ignore current customers while interacting with the promotion and marketing service interface.

The inventors have therefore determined that existing electronic systems for generating promotions fail to address these issues. As a result of these problems and others that may arise from time to time, delays and inefficiencies may be introduced into the process of generating a new promotion. In many cases, generation of a promotion by a merchant may be completely impossible without obtaining reliable internet connection or interfacing with the mobile app or website.

System Architecture and Example Apparatus

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

Figure 1:
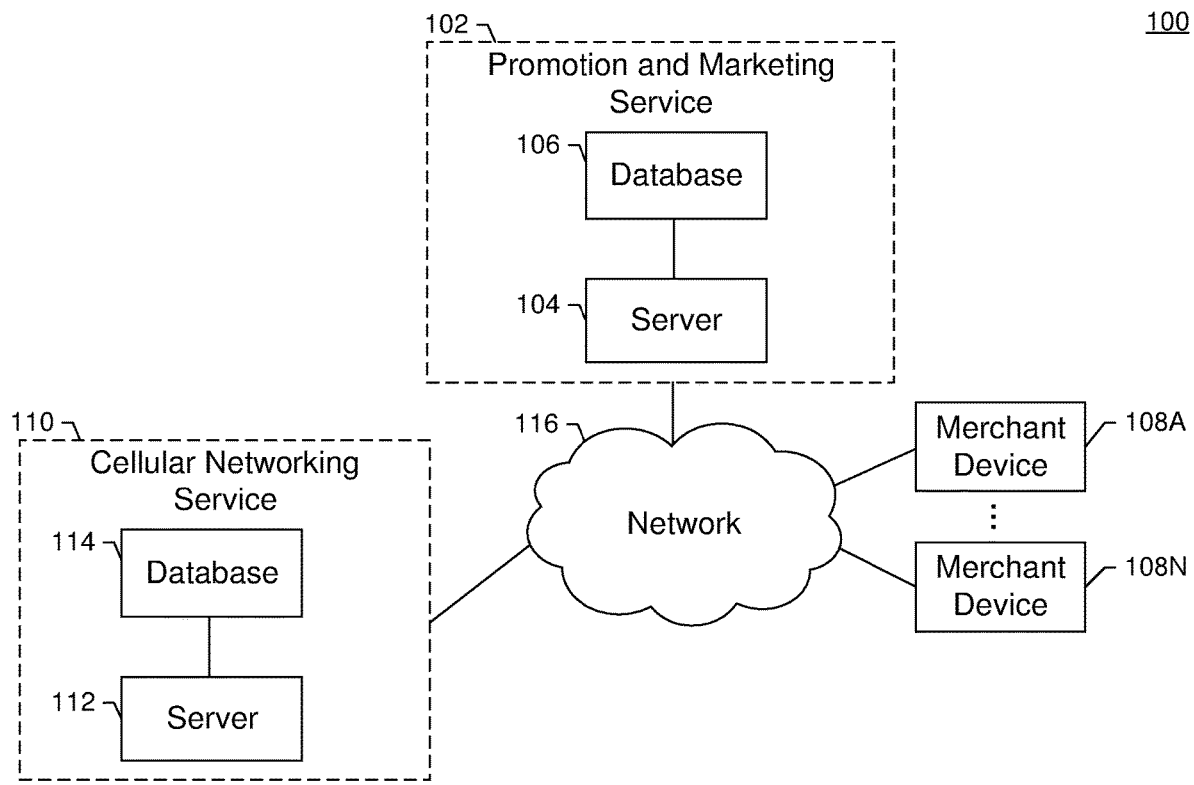
FIG. 1 is block diagram of a system that is configured to facilitate various operations, in accordance with an example embodiment.

In this regard, FIG. 1 discloses an example computing system within which embodiments of the present invention may operate. Merchants may access a promotion and marketing service 102 and/or a cellular networking service 110 via a network 116 (e.g., the Internet, or the like) using merchant devices 108A through 108N. Moreover, the promotion and marketing service 102 may comprise a server 104 in communication with a database 106 and cellular networking service 110 may comprise server 112 and database 114.

Both the promotion and marketing service server 104 and the cellular networking service server 112 may be embodied as a computer or computers as known in the art. The servers 104 and 112 may provide for receiving of electronic data from various sources, including but not necessarily limited to the merchant devices 108A-108N. For example, the servers 104 and 112 may be operable to receive and process clickstream data provided by the merchant devices 108A-108N. The server 104 may also facilitate e-commerce transactions based on transaction information provided by the merchant devices 108A-108N. The server 104 may facilitate the generation and providing of various electronic communications and marketing materials based on the received electronic data.

Databases 106 and 114 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, user account credentials for system administrators, merchants, and consumers, data indicating the products and promotions offered by the promotion and marketing service, clickstream data, analytic results, reports, financial data, and/or the like.

The merchant devices 108A-108N may be any computing device as known in the art and operated by a consumer. Electronic data received by the server 104 from the merchant devices 108A-108N may be provided in various forms and via various methods. For example, the merchant devices 108A-108N may include desktop computers, laptop computers, smartphones, netbooks, tablet computers, wearables, and the like. The information may be provided through various sources on these consumer devices.

In embodiments where a merchant device 108 is a mobile device, such as a smart phone or tablet, the consumer device 108 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 may leverage the application framework offered by the mobile operating system to allow consumers to designate which information is provided to the app and which may then be provided to the promotion and marketing service 102. In some embodiments, merchants and/or consumers may "opt in" to provide particular data to the promotion and marketing service 102 in exchange for a benefit, such as improved relevancy of marketing communications offered to the user. In some embodiments, the merchant and/or the consumer may be provided with privacy information and other terms and conditions related to the information provided to the promotion and marketing service 102 during installation or use of the app. Once the merchant and/or the consumer provides access to a particular feature of the mobile device, information derived from that feature may be provided to the promotion and marketing service 102 to improve the quality of the merchant's and/or consumer's interactions with the promotion and marketing service.

For example, the merchant and/or the consumer may indicate that they wish to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the merchant and/or the consumer may decide at a later point to disable the ability of the app to access the location services circuitry, thus limiting the access of the merchant's and/or consumer's location information to the promotion and marketing service 102.

Various other types of information may also be provided in conjunction with an app executing on the mobile device. For example, if the mobile device includes a social networking feature, the merchant and/or the consumer may enable the app to provide updates to the merchant's and/or the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the merchant device 108 may interact through the promotion and marketing service 102 via a web browser. As yet another example, the merchant device 108 may include various hardware or firmware designed to interface with the promotion and marketing service 102 (e.g., where the merchant device 108 is a purpose-built device offered for the primary purpose of communicating with the promotion and marketing service 102, such as a store kiosk).

Moreover, the merchant devices 108A-108N may be any computing device as known in the art and operated by a merchant. For example, the merchant devices 108A-108N may include a merchant point-of-sale, a merchant e-commerce server, a merchant inventory system, or a computing device accessing a web site designed to provide merchant access (e.g., by accessing a web page via a browser using a set of merchant account credentials). Electronic data received by the promotion and marketing service 102 from the merchant devices 108A-108N may also be provided in various forms and via various methods. For example, the merchant devices 108A-108N may provide real-time transaction and/or inventory information as purchases are made from the merchant. In other embodiments, the merchant devices 108A-108N may be employed to provide information to the promotion and marketing service 102 to enable the promotion and marketing service 102 to generate promotions or other marketing information to be provided to consumers.

An example of a data flow for exchanging electronic information among one or more merchant devices, the promotion and marketing service, and a cellular networking service is described below with respect to FIG. 3.

Example Apparatus for Implementing Embodiments of the Present Invention

Figure 2:
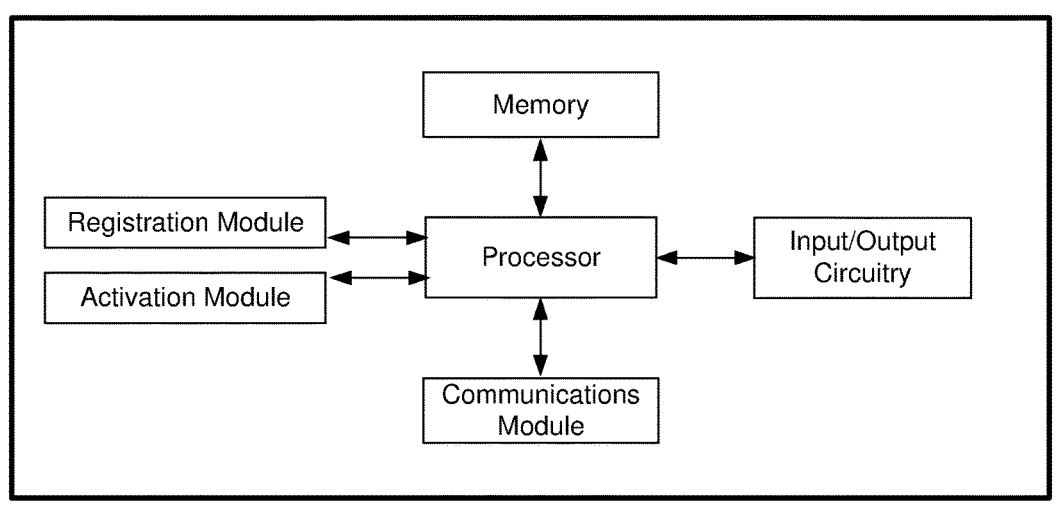
FIG. 2 is a block diagram of an apparatus that may be specifically configured in accordance with an example embodiment of the present invention.

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, registration circuitry 210, and activation circuitry 212. The apparatus 200 may be configured to execute the operations described above with respect to FIG. 1 and below with respect to FIG. 3. Although these components 202-212 are described with respect to functional limitations, it should be understood that the particular implementations necessarily include the use of particular hardware. It should also be understood that certain of these components 202-212 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Registration circuitry 210 includes hardware configured to register and generate promotions to be offered to consumers based on clickstream data received via a network interface and assign and transmit promotion identifiers for each of one or more promotions. The registration circuitry 210 may utilize processing circuitry, such as the processor 202, to perform these actions. The registration circuitry 210 may receive the clickstream data via a network interface provided by the communications circuitry 208. However, it should also be appreciated that, in some embodiments, the registration circuitry 210 may include a separate processor, specially configured field programmable gate array (FPGA), or application specific interface circuit (ASIC) to perform the reception of promotion component data from a user and the generation of one or more promotions as well as the assignment of promotion identifiers for each of one or more generated promotions and the transmission of the promotion identifiers. The registration circuitry 210 is therefore implemented using hardware components of the apparatus configured by either hardware or software for implementing these planned functions.

Activation circuitry 212 includes hardware configured to receive commands and a promotion identifier, access a promotion database and perform the associated command based on clickstream data received via a network interface. The activation circuitry 212 may utilize processing circuitry, such as the processor 202, to perform these actions. The activation circuitry 212 may receive the clickstream data via a network interface provided by the communications circuitry 208. However, it should also be appreciated that, in some embodiments, the activation circuitry 212 may include a separate processor, specially configured field programmable gate array (FPGA), or application specific interface circuit (ASIC) to perform the reception of a command and promotion identifier routed via, for example a cellular network, the access to a promotion database and the, for example, activation of the promotion. The activation circuitry 212 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Electronic Marketing Information Service Data Flow

FIG. 3 depicts an example data flow 300 illustrating interactions between a merchant device (e.g., 108A-N), a cellular network service server 112, and a promotion and marketing service server 104. The data flow 300 illustrates how electronic information may be passed among various systems when employing a cellular network service server 112 and a promotion and marketing service server 104 in accordance with embodiments of the present invention.

At step 305, the merchant device 108A may provide input for the generation and/or providing of a promotion (e.g., promotion component information) to the promotion and marketing service server 104. In some examples, this may include providing functionality made available to promotion providers, using for example, a merchant device, via a self-service tool (e.g., such as the self-service tool provided in U.S. patent application Ser. No. 13/749,272, filed on Jan. 24, 2013, and entitled "METHOD, APPARATUS, AND COMPUTER READABLE MEDIUM FOR PROVIDING A SELF-SERVICE INTERFACE", which is hereby incorporated by reference in its entirety). That is, while in some embodiments, promotion component information may be provided over the phone or in person to a salesperson or other representative of a promotion and marketing service, embodiments herein may provide systems, methods and computer readable media for programmatically registering and verifying a merchant, and allowing the merchant to generate and/or revise deal offers. In providing such functionality, the system may be configured to, for example, monitor and analyze various promotions, including current promotions and analytics data about promotion-related purchases that enable the system to determine the relative successfulness of a promotion for a merchant and/or category of merchant. These promotions may be indexed with a set of merchant self-service indicators, such that when a new merchant registers with the system, the system determines the merchant self-service indicators for the newly added merchant and suggests promotions associated with those merchant self-service indicators. Upon determining what has been more successful or is expected to be a more successful promotion for the merchant based on the merchant self-service indicators, the system can present the promotion to the newly registered merchant for approval and/or make the promotion to consumers programmatically by a promotional system located remotely from the merchant device and the consumer device. In some embodiments, the remotely located promotional system may be further configured to revise the promotion programmatically and/or upon receiving the merchant's approval of the proposed edits to the promotion.

At step 310, the promotion and marketing service server 104 may generate and/or assign promotion identification information (e.g., a "promo id") to the promotion component data. At step 315, the promotion and marketing service server 104 may then provide the promotion identification information to the merchant device 108A. Moreover, the promotion and marketing service server 104 may provide one or more commands and or one or more short codes configured for access to the promotion and marketing service server 104.

At step 320, merchant device 108A may transmit a text message, the text message addressed to a short code and including a command and promotion identification information, which, based on the short code may be received by the cellular networking service server 112. Upon accessing the cellular networking service database 114, at step 325, an intended recipient is identified by looking-up or otherwise accessing information associated with the short code. Next, the cellular networking service server 112 may, at step 330, transmit or otherwise provide the command and the promotion identification information to the promotion and marketing service server 104. Upon receipt of the command and promotion identification information, the promotion and marketing service server 104 may, at step 335, access the promotion and marketing service database 106, validate the cellular telephone number or other merchant device identifying information that may be received in conjunction with the text message, and, in some embodiments, look-up the associated promotion component data and/or redemption parameters associated with promotion identified by the promotion identification information. The promotion and marketing service server 104 may then, at step 340, perform a function associated with the command (e.g., "activate and/or deactivate a merchant promotion, "start" the promotion, "activate" the promotion or otherwise offer the promotion for sale by, for example, providing the promotion content to one or more consumers via an electronic marketing communication). In some embodiments, a confirmation may be sent, for example, at step 345, from the cellular networking service server 112 or the promotion and marketing service server 104 to the merchant device 108A.

Embodiments advantageously provide for improvements to the promotion and marketing service server 104 by enabling the immediate or near immediate activation and/or deactivation of one or more promotions, via a cellular network service in an instance, for example, when a WIFI connection is unavailable. Moreover, embodiments advantageously provide for improvements to the merchant device 108A-108N by allowing for the immediate or near immediate activation and/or deactivation of one or more promotions by sending a text message via a cellular network service in an instance, for example, when a WIFI connection is unavailable and/or when interaction with a website or mobile app is unnecessary and/or undesirable and/or when the time and effort required for such interaction is unavailable.

Exemplary Operation for Implementing Embodiments of the Present Invention

Figure 4:
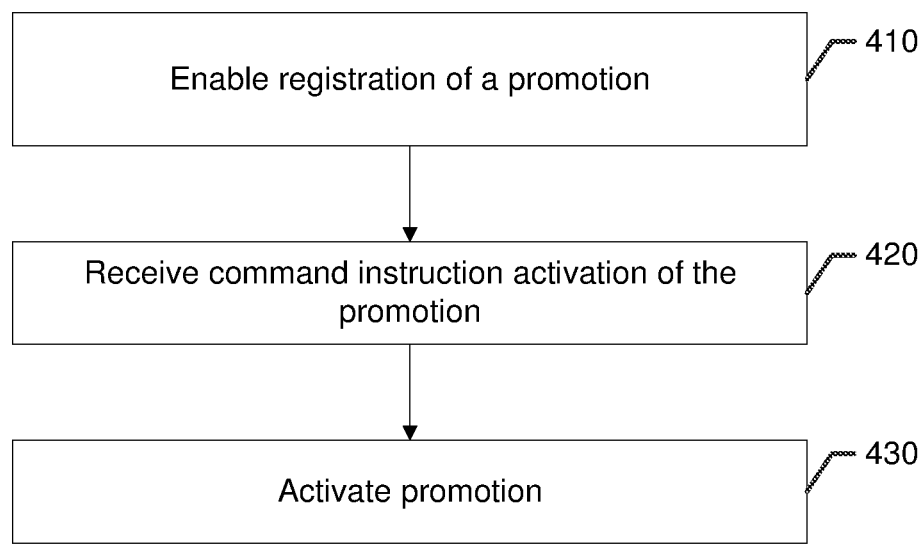

In some embodiments, registration module 210 and activation module 212 may be configured to facilitate the immediate or near immediate activation and/or the deactivation of promotions. FIGS. 4-7 illustrate exemplary processes for receiving user input for, for example, generating one or more promotions, and, upon reception of a command, activating and/or deactivating one or more promotions. FIG. 4 shows an example method that may be executed by one or more machines, for example by apparatus 200, including registration module 210 and activation module 212 of FIG. 2, for facilitating the immediate or near immediate activation and/or the deactivation of promotions, in accordance with some embodiments discussed herein.

FIG. 4 illustrates a flow diagram depicting an example of a process 400 for facilitating the immediate or near immediate activation and/or the deactivation of promotions in accordance with embodiments of the present invention. The process illustrates how, upon generation of a promotion, a command may be received and the promotion may then be activated. The process 400 may be performed by an apparatus, such as the apparatus 200 described above with respect to FIG. 2.

As shown in block 410 of FIG. 4, an apparatus, such as apparatus 200, may be configured for enabling registration of one or more promotions. Registration may include identifying and/or selecting of promotion content, promotion components, and/or redemption parameters. Subsequent to registration, as shown in block 420 of FIG. 4, an apparatus, such as apparatus 200, may be configured for receiving a command (e.g., instructing performance of some activity) and promotion identification information identifying the promotion registered in block 410. Once the command is received, as shown in block 430 of FIG. 4, an apparatus, such as 200, may be configured for performing the activity as instructed by the command received in block 420.

In some embodiments, registration may be performed at any time prior to reception of the command and does not require the same merchant device be used for performing registration and sending the command, nor the same format or software be used in performing registration and sending the command. For example, in some embodiments, as will be described in more detail below with reference to FIG. 5, the promotion and marketing service 102 may interact with the same merchant device 108A-N for both the registration and the command via a mobile app interface or a website. In other embodiments, however, which will be described in more detail with reference to FIGS. 6 and 7, the promotion and marketing service may interact with a cellular networking service through the use of short codes to receive commands from merchant devices.

WIFI Embodiment

Figure 5:
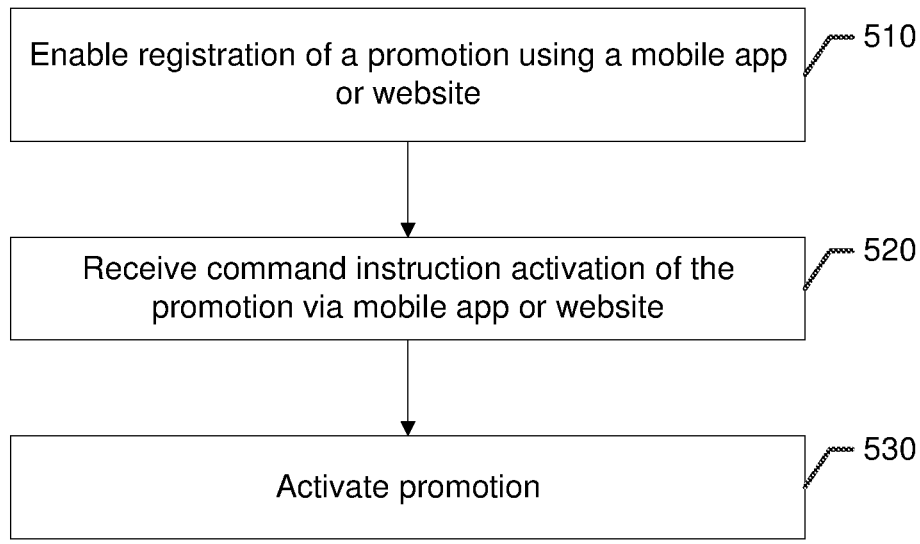

FIG. 5 illustrates a flow diagram depicting an example of a process 500 for facilitating the immediate or near immediate activation and/or the deactivation of promotions in accordance with embodiments of the present invention. Specifically, process 500 illustrates an embodiment in which a WIFI or, in some embodiments, a hardwired connection is available. The process 500 may be performed by an apparatus, such as the apparatus 200 described above with respect to FIG. 2.

As shown in block 510 of FIG. 5, an apparatus, such as apparatus 200, may be configured for enabling registration of one or more promotions via, for example, a mobile application and/or a website application (e.g., registration API or the like). Registration of promotions may include at least receiving user input of product or service and a price.

As shown in block 520 of FIG. 5, an apparatus, such as apparatus 200, may be configured for receiving, via the mobile app or the website, a command (e.g., instructing performance of some activity) and promotion identification information identifying the promotion registered in block 510. As shown in block 530 of FIG. 5, an apparatus, such as 200, may be configured for performing the activity as instructed by the command received in block 520.

Cellular Network Embodiment

Figure 6:
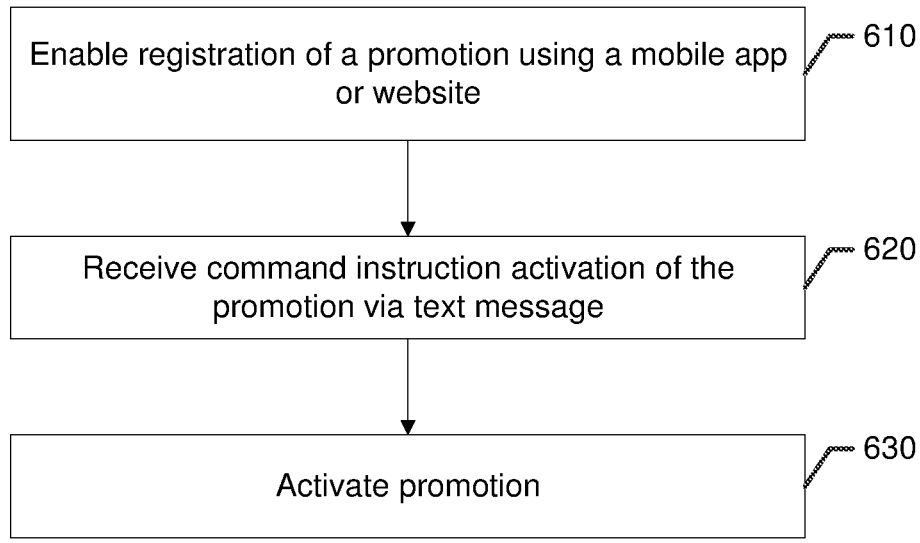

FIG. 6 illustrates a flow diagram depicting an example of a process 600 for facilitating the immediate or near immediate activation and/or the deactivation of promotions in accordance with embodiments of the present invention. Specifically, process 600 illustrates an embodiment in which a WIFI or, in some embodiments, a hardwired connection is unavailable, and a cellular network is available. The process 600 may be performed by an apparatus, such as the apparatus 200 described above with respect to FIG. 2.

As shown in block 610 of FIG. 6, an apparatus, such as apparatus 200, may be configured for enabling registration of one or more promotions via, for example, a mobile application and/or a website application (e.g., registration API or the like). Registration of promotions may include at least receiving user input of product or service and a price. Here, registration may occur via any network connection (e.g., WIFI, hardwired or cellular).

As shown in block 620 of FIG. 6, an apparatus, such as apparatus 200, may be configured for receiving, via information provided in a text message to a cellular networking service, a command (e.g., instructing performance of some activity) and promotion identification information identifying the promotion, for example the promotion registered in block 610. As shown in block 630 of FIG. 6, an apparatus, such as 200, may be configured for performing the activity as instructed by the command received in block 620. The embodiment shown in flowchart 600 as shown in FIG. 6 is detailed further with reference to FIG. 7.

Figure 7:
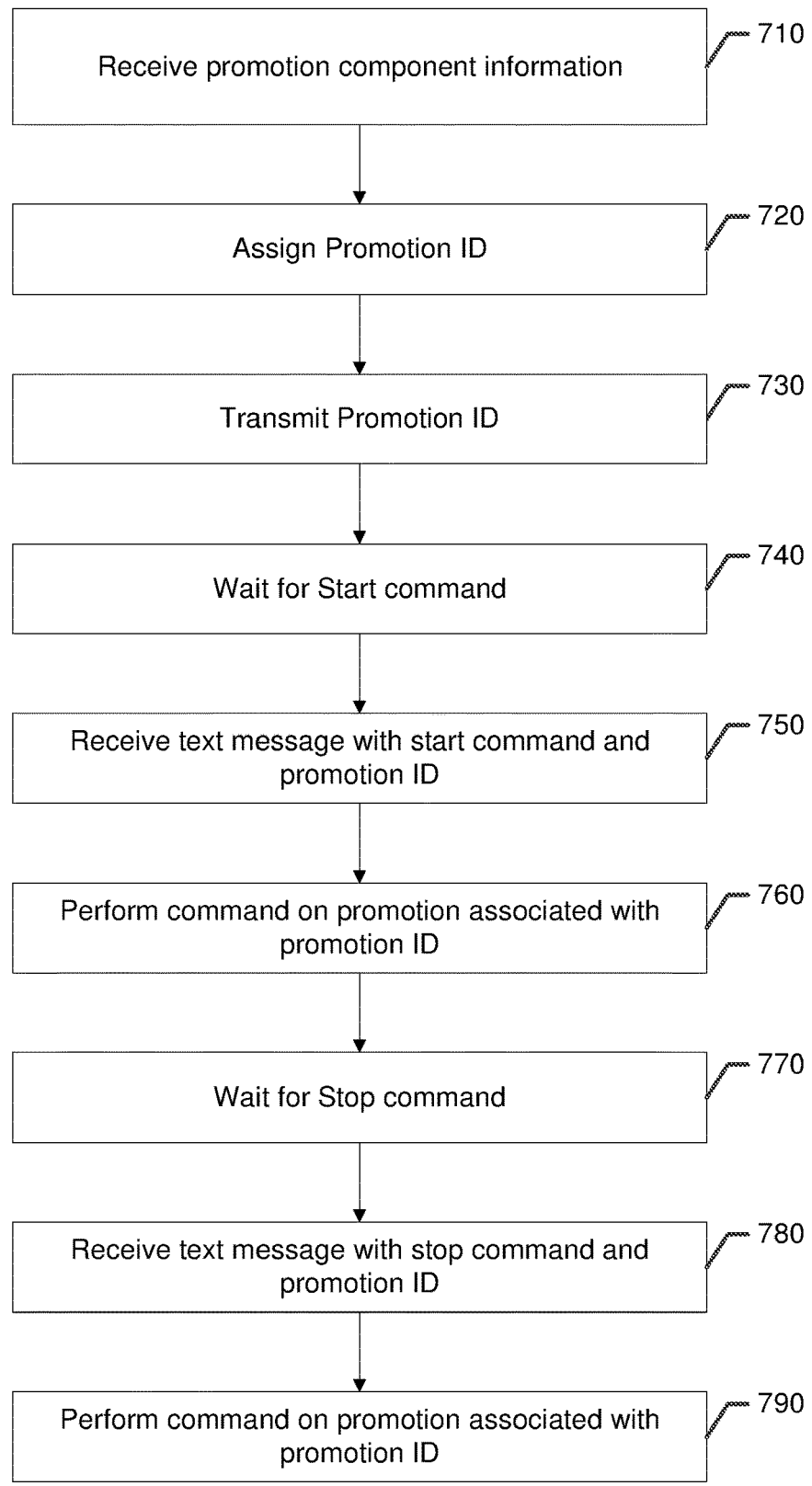

Facilitating the Immediate or Near Immediate Activation and/or the Deactivation of Promotions FIG. 7 illustrates a flow diagram depicting an example of a process 700 for facilitating the immediate or near immediate activation and/or the deactivation of promotions in accordance with embodiments of the present invention.

Specifically, process 600 illustrates an embodiment in which a WIFI or, in some embodiments, a hardwired connection is unavailable, and a cellular network is available. The process 600 may be performed by an apparatus, such as the apparatus 200 described above with respect to FIG. 2.

As shown in block 710 of FIG. 7, an apparatus, such as apparatus 200, may be configured for enabling registration via, for example, a mobile application and/or a website application (e.g., registration API or the like). That is, an apparatus, for example apparatus 200, may be configured to receive registration information. Registration information may include, for example, a username and a password, as well as, in some embodiments, other information. In some embodiments, registration information may include a cellular phone number or other mobile device identification information. In some embodiments, the cellular phone number may be authenticated, such as, for example, by sending a message to the cellular number provided, the message including information configured to be input as part of the registration process, thus verifying the cellular phone number. Registration information may further include one or more promotions, each of which may include at least information indicating a product or service and a price and/or discount. Here, registration may occur via any network connection (e.g., WIFI, hardwired or cellular).

In some embodiments, as part of the registration process, or otherwise, instructions may be provided to the user indicating one or more commands that are available to send via a text message as well as one or more short codes available for use. As such, as shown in block 720 of FIG. 7, an apparatus, such as apparatus 200, may be configured for assigning promotion identification information to a promotion, for example, a promotion generated in block 710. For example, the merchant may be a restaurant (e.g., Sal's Italian Restaurant), and a user (e.g., utilizing, for example, merchant device 108A) may register a promotion for $5 off large pizzas or the like. In some embodiments, the user (e.g., utilizing, for example, merchant device 108A) may register a plurality of promotions. For each promotion, the promotion and marketing service may assign information used to identify the promotion (i.e. promotion identification information). Once the promotion identification information is assigned, the promotion identification information may be provided to the merchant device. Accordingly, as shown in block 730 of FIG. 7, an apparatus, such as apparatus 200, may be configured for transmitting or otherwise providing the promotion identification information assigned in block 720 to the merchant device (e.g., merchant device 108A).

Once a promotion (or in some embodiments, a plurality of promotions) are registered, the promotion and marketing service may then wait for instruction from the merchant to activate (e.g., make live, provide to one or more consumers for purchase and redemption, or the like) the promotion (or one or more promotions). As shown in block 740 of FIG. 7, an apparatus, such as apparatus 200, may be configured for waiting for a command.

In some embodiments, for example, subsequent to registration, the user (e.g., utilizing, for example, merchant device 108A) may be in a location in which WIFI is inaccessible, or in other embodiments, may have changed devices from, for example, a hardwired or WIFI enabled computer or the like to a cellular phone having cellular networking accessibility. Accordingly, the user (e.g., utilizing, for example, merchant device 108A, 108N, or the like) may wish to activate the promotion, and accordingly, does so via the cellular networking service by, for example, addressing a text message to a short code and providing a command and the promotion identification information. As shown in block 750 of FIG. 7, an apparatus, such as apparatus 200, may be configured for receiving, via information provided in a text message to a cellular networking service, a command (e.g., instructing performance of some activity) and promotion identification information identifying a promotion (e.g., the promotion registered in block 710). For example, in some embodiments, a command may be received instructing apparatus 200, such as for example promotion and marketing service server 102, to activate a promotion.

In some embodiments, activation may include accessing promotion and marketing service database 106, extracting promotion component information (e.g., provided in block 710), and altering promotion component information and/or otherwise activating the promotion. As shown in block 760 of FIG. 6, an apparatus, such as apparatus 200, may be configured for performing the activity (e.g., activating the promotion) as instructed by the command received in block 750. In some embodiments, the apparatus may be further configured to validate merchant device identifying information (e.g., a cellular phone number or device ID) that may be transmitted with the text message. Upon validation, which may include confirming that the cellular telephone number is associated with the promotion identified by the promotion identification information, the activity instructed by the command may be performed.

In some embodiments, upon activation, the promotion and marketing service may be configured to provide one or more electronic marketing communications offering the promotion to one or more relevant consumers. Relevant consumers may include those in proximity to the merchant, those in proximity to one or more of a merchant's known locations (e.g., brick and mortar stores), those in proximity to a location specified by the merchant, for example, in the promotion component data, or the like. Moreover, relevant consumers may further include those consumers having specified, for example, in their user preferences and/or through prior purchases, a preference for the product or service, the category and/or sub-category of the promotion, any associated location of the promotion and/or the merchant. In each of U.S. patent application Ser. No. 13/411,502, filed Mar. 2, 2012, titled "RELEVANCE SYSTEM FOR CONSUMER DEALS", U.S. patent application Ser. No. 13/829,581 entitled "Promotion Offering System" and filed on Mar. 14, 2013, U.S. patent application Ser. No. 12/776,028, now U.S. Pat. No. 8,355,948, titled "SYSTEM AND METHODS FOR DISCOUNT RETAILING" filed on May 7, 2010, each of which is hereby incorporated by reference in its entirety, algorithms are provided for matching consumers to relevant promotions.

In some embodiments, at this point the promotion is available for sale. For example, the merchant (e.g., Sal's Italian Restaurant), may have activated the promotion for $5 off large pizzas or the like. As a result of activating the promotion, consumers may have purchased the promotion and/or began arriving at Sal's Italian Restaurant. In some embodiments, the promotion and marketing service may monitor and, in some embodiments, transmit or otherwise make available periodic or continuous updates of the sales performance of the promotion. As shown in block 770 of FIG. 6, an apparatus, such as apparatus 200, may be configured for waiting for a second command. That is, while, for example, offering the promotion for sale or otherwise performing the activity as previously instructed, the promotion and marketing service may await further commands.

In some embodiments, for example, subsequent to transmitting the activation command, the user (e.g., utilizing, for example, merchant device 108A, 108N, or the like) may still be in a location in which WIFI is inaccessible, or in other embodiments, may still be using a cellular phone having cellular networking accessibility. The user (e.g., utilizing, for example, merchant device 108A, 108N, or the like) may wish to deactivate the promotion (because, for example, the product is unavailable, the restaurant is filled, or the like) and accordingly, does so via the cellular networking service by, for example, addressing a text message to the short code and providing a second command and the promotion identification information.

As such, as shown in block 780 of FIG. 6, an apparatus, such as apparatus 200, may be configured for receiving, via information provided in a text message to a cellular networking service, a command (e.g., instructing performance of some activity such as, for example, deactivation of a promotion) and promotion identification information identifying the promotion registered in block 710. Once the second command is received, the apparatus may perform the instruction. Accordingly, as shown in block 790 of FIG. 6, an apparatus, such as apparatus 200, may be configured for performing the activity as instructed by the command (e.g., deactivating a promotion) received in block 780.

In some embodiments, once a promotion is deactivated, the promotion and marketing service may (1) honor promotions that have been purchased, but not yet redeemed and discontinue the sale of promotions; (2) refund promotions that have been purchased, yet not redeemed; and/or (3) give cash value of purchase price (but not promotion portion).

Figures

FIGS. 4-7 illustrate example flowcharts of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other devices associated with execution of software including one or more computer program instructions.

For example, one or more of the procedures described herein may be embodied by computer program instructions. In this regard, the computer program instructions which embody the procedures described above may be stored by a memory 204 of an apparatus employing an embodiment of the present invention and executed by a processor 202 in the apparatus.

As will be appreciated by one of ordinary skill in the art, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 4-7 when executed, convert a computer or processing circuitry into a particular machine configured to perform an example embodiment of the present invention. Accordingly, the operations of FIGS. 4-7 define an algorithm for configuring a computer or processing to perform an example embodiment. In some cases, a general purpose computer may be provided with an instance of the processor which performs the algorithms of FIGS. 4-7 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments, additional optional operations may also be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

I claim:

1. An apparatus for facilitating immediate activation of a promotion, the apparatus comprising:
   registration circuitry configured to:
     receive, from a first device, via a Wi-Fi connection, at a server, promotion component information, the promotion component information comprising one or more products or services and a price;
     generate, at the server, via a processor, a promotion comprising the promotion component information;
     assign, at the server, via a processor, promotion identification information to the promotion; and
     transmit, to the first merchant device, a short code that can be used to later activate the promotion, enabling, via transmission of a message addressed to the short code, subsequent to the registration of the promotion, activation of the promotion, via a text message over a cellular network service; and
   activation circuitry configured to:
     receive, at the server, subsequent to the generation and registration of the promotion, from the cellular networking service, information provided in the text message, the text message sent from a second merchant device, addressed to the short code, and originating from a location at which any Wi-Fi connection is inaccessible, the text message comprising (1)

a command, and (2) custom information in the form of at least the promotion identification information, wherein the command is indicative of an instruction to activate the promotion identified by the promotion identification information, and wherein the information provided in the text message further includes a cellular phone number;
receive, at the server, separately from the text message, location information indicative of a current location of the second merchant device;
access, by the server, via the processor, a promotion and marketing service database using the promotion identification information;
extract, by the server, via the processor, the promotion component information associated with the promotion identified by the promotion identification information;
validate, by the server, via the processor, the cellular phone number as a device identifier associated with the promotion identification information;
alter, by the server, via the processor, the promotion component information in accordance with the command;
upon validation that the cellular phone number is associated with the promotion identified by the promotion identification information, cause, by the server, via the processor, activation of the promotion;
receive location information, from one or more consumer devices, indicative of locations of each respective device of the one or more consumer devices; and
cause, by the server, via the processor, an electronic marketing communication to be communicated to one or more consumer devices identified as in proximity to the current location of the second merchant device and having specified through prior purchases, a preference for any associated location of the second merchant device.

2. The apparatus according to claim 1, wherein the activation circuitry is further configured to receive, at the server, subsequent to the activation of the promotion, from the cellular networking service, a second text message, the second text message sent from the second merchant device, addressed to the short code, wherein the second text message comprising a second command, and wherein the second command is indicative of an instruction to deactivate the promotion identified by the promotion identification information.

3. The apparatus according to claim 2,
wherein the activation circuitry is further configured to:
upon deactivation, cause the electronic marketing communication to cease offering the promotion to the one or more consumers.

4. A computer program product for facilitating immediate activation of a promotion, the computer program product comprising at least one non-transitory computer-readable storage medium having computer-executable program code instructions stored therein, the computer-executable program code instructions comprising program code instructions for:
causing registration circuitry to:
receive, from a first device, via a Wi-Fi connection, at a server, promotion component information, the promotion component information comprising one or more products or services and a price;
generate, at the server, via a processor, a promotion comprising the promotion component information;
assign, at the server, via a processor, promotion identification information to the promotion; and
transmit, to the first merchant device, a short code that can be used to later activate the promotion, enabling, via transmission of a message addressed to the short code, subsequent to the registration of the promotion, activation of the promotion, via a text message over a cellular network service; and
causing activation circuitry to:
receive, at the server, subsequent to the generation and registration of the promotion, from the cellular networking service, information provided in the text message, the text message sent from a second merchant device, addressed to the short code, and originating from a location at which any Wi-Fi connection is inaccessible, the text message comprising (1) a command, and (2) custom information in the form of at least the promotion identification information, wherein the command is indicative of an instruction to activate the promotion identified by the promotion identification information, and wherein the information provided in the text message further includes a cellular phone number;
receive, at the server, separately from the text message, location information indicative of a current location of the second merchant device;
access, by the server, via the processor, a promotion and marketing service database using the promotion identification information;
extract, by the server, via the processor, the promotion component information associated with the promotion identified by the promotion identification information;
validate, by the server, via the processor, the cellular phone number as a device identifier associated with the promotion identification information;
alter, by the server, via the processor, the promotion component information in accordance with the command;
upon validation that the cellular phone number is associated with the promotion identified by the promotion identification information, cause, by the server, via the processor, activation of the promotion;
receive location information, from one or more consumer devices, indicative of locations of each respective device of the one or more consumer devices; and
cause, by the server, via the processor, an electronic marketing communication to be communicated to one or more consumer devices identified as in proximity to the current location of the second merchant device and having specified through prior purchases, a preference for any associated location of the second merchant device.

5. The computer program product according to claim 4, wherein the activation circuitry is further configured to receive, at the server, subsequent to the activation of the promotion, from the cellular networking service, a second text message, the second text message sent from the second merchant device, addressed to the short code, wherein the second text message comprising a second command, and wherein the second command is indicative of an instruction to deactivate the promotion identified by the promotion identification information.

6. The computer program product according to claim 5, wherein the computer-executable program code instructions further comprise program code instructions for further causing the registration circuitry to:
upon deactivation, cause the electronic marketing communication to cease offering the promotion to the one or more consumers.

7. A method for facilitating immediate activation of a promotion, the method comprising:
receiving, via registration circuitry, from a first device, via a Wi-Fi connection, at a server, promotion component information, the promotion component information comprising one or more products or services and a price;
generating, at the server, via the registration circuitry, a promotion comprising the promotion component information; and
assigning, at the server, via the registration circuitry, promotion identification information to the promotion; and
transmitting, to the first merchant device, a short code that can be used to later activate the promotion, enabling, via transmission of a message addressed to the short code, subsequent to the registration of the promotion, activation of the promotion, via a text message over a cellular network service,
receiving, at the server, subsequent to the generation and registration of the promotion, from the cellular networking service, information provided in the text message, the text message sent from a second merchant device, addressed to the short code, and originating from a location at which any Wi-Fi connection is inaccessible, the text message comprising (1) a command, and (2) custom information in the form of at least the promotion identification information, wherein the command is indicative of an instruction to activate the promotion identified by the promotion identification information, and wherein the information provided in the text message further includes a cellular phone number;
receiving, at the server, separately from the text message, location information indicative of a current location of the second merchant device;
accessing, at the server, via the activation circuitry, a promotion and marketing service database using the promotion identification information;
extracting, via the activation circuitry, the promotion component information associated with the promotion identified by the promotion identification information;
validating, at the server, via the activation circuitry, the cellular phone number as a device identifier associated with the promotion identification information;
altering, at the server, via the activation circuitry, the promotion component information in accordance with the command;
upon validation that the cellular phone number is associated with the promotion identified by the promotion identification information, causing, by the server via the activation circuitry, activation of the promotion;
receiving location information, from one or more consumer devices, indicative of locations of each respective device of the one or more consumer devices; and
causing, by the server, via the processor, an electronic marketing communication to be communicated to one or more consumer devices identified as in proximity to the current location of the second merchant device and having specified through prior purchases, a preference for any associated location of the second merchant device.

8. The method according to claim 7, wherein the activation circuitry is further configured to receive, at the server, subsequent to the activation of the promotion, from the cellular networking service, a second text message, the second text message sent from the second merchant device, addressed to the short code, wherein the second text message comprising a second command, and wherein the second command is indicative of an instruction to deactivate the promotion identified by the promotion identification information.

9. The method according to claim 8, further comprising:
upon deactivation, causing, via activation circuitry, the electronic marketing communication to cease offering the promotion to the one or more consumers.

10. The apparatus according to claim 1, wherein the registration circuitry is further configured to:
provide a keyword used to i) differentiate a user of the short code from other users of the short code; and ii) determine a recipient of the text message addressed to the short code.

11. The computer program product according to claim 4, wherein the computer-executable program code instructions further comprise program code instructions for further causing the registration circuitry to:
provide a keyword used to i) differentiate a user of the short code from other users of the short code; and ii) determine a recipient of the text message addressed to the short code.

12. The method according to claim 7, further comprising:
providing, via the registration circuitry, a keyword used to i) differentiate a user of the short code from other users of the short code; and ii) determine a recipient of the text message addressed to the short code.

13. The apparatus according to claim 1, wherein the promotion component information received by the registration circuitry is received via a website or a mobile application.

14. The computer program product according to claim 4, wherein the promotion component information received by the registration circuitry is received via a website or a mobile application.

15. The method according to claim 7, wherein the promotion component information received by the registration circuitry is received via a website or a mobile application.

* * * * *